United States Patent [19]

Vinciarelli

[11] Patent Number: 4,675,797
[45] Date of Patent: Jun. 23, 1987

[54] CURRENT-FED, FORWARD CONVERTER SWITCHING AT ZERO CURRENT

[75] Inventor: Patrizio Vinciarelli, Boston, Mass.

[73] Assignee: Vicor Corporation, Andover, Mass.

[21] Appl. No.: 795,634

[22] Filed: Nov. 6, 1985

[51] Int. Cl.⁴ ......................................... H02M 3/335
[52] U.S. Cl. ......................................... 363/21; 363/19
[58] Field of Search ...................... 363/19, 20, 21, 97, 363/131

[56] References Cited

U.S. PATENT DOCUMENTS

| | | | |
|---|---|---|---|
| 4,253,136 | 2/1981 | Nanko | 363/21 |
| 4,318,164 | 3/1982 | Onodera et al. | 363/21 |
| 4,386,394 | 5/1983 | Kocher et al. | 363/20 |
| 4,415,959 | 11/1983 | Vinciarelli | 363/21 |
| 4,481,565 | 11/1984 | Colton | 363/21 X |
| 4,486,823 | 12/1984 | Palm | 363/21 |
| 4,498,128 | 2/1985 | Peterson et al. | 363/21 |
| 4,499,531 | 2/1985 | Bray | 363/19 |
| 4,524,411 | 6/1985 | Willis | 363/21 |
| 4,546,421 | 10/1985 | Bello et al. | 363/97 X |

Primary Examiner—Patrick R. Salce
Assistant Examiner—Marc S. Hoff

[57] ABSTRACT

A single-ended, zero-current switching, forward converter circuit converts power from a current source to a voltage load in a succession of energy transfer cycles using a transformer constructed to have an effective leakage inductance $L_{1e}$, a capacitor (C) in series with the primary winding of the transformer, a switching device also in series with the primary winding, a unidirectional conducting device connected in series with the secondary winding in an orientation to conduct when the switching device is conducting, and a controller that selectively closes and opens the switching device to transfer energy from the capacitor via the effective primary leakage inductance to the load during an energy transfer cycle having a characteristic time scale determined by $L_{1e}$ and C.

13 Claims, 6 Drawing Figures

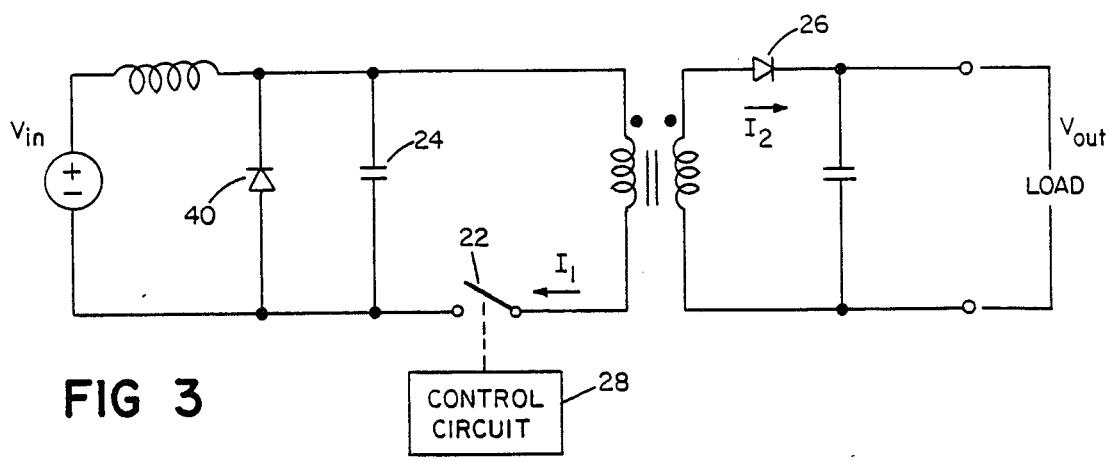
FIG 3
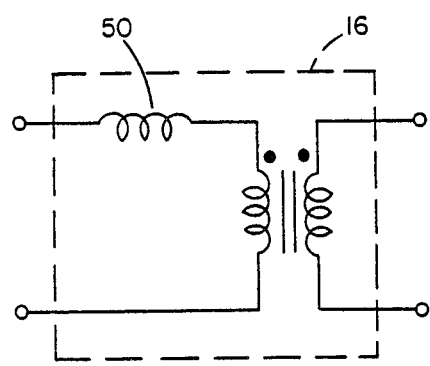
FIG 4
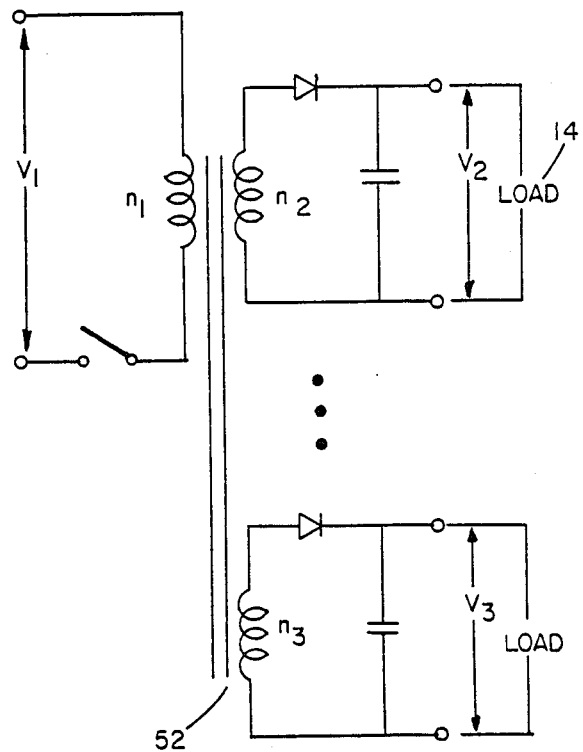
FIG 5
FIG 6

CURRENT-FED, FORWARD CONVERTER SWITCHING AT ZERO CURRENT

BACKGROUND OF THE INVENTION

This invention relates to DC-to-DC power conversion of the zero-current switching, forward, single-ended type.

One such converter (disclosed in Vinciarelli, U.S. Pat. No. 4,415,959, issued Nov. 15, 1983, incorporated herein by reference) converts energy from a voltage source for delivery to a current sink using a transformer that has a controlled amount of effective secondary leakage current. On the source side of the transformer, a switch is connected in series with the source and the primary winding of the transformer. The switch connects the source to and disconnects it from the primary winding in a succession of power transfer cycles. On the load side of the transformer, a diode and a capacitor are connected in series with the secondary winding. The capacitor and the effective leakage inductance define a time scale for the cycling of the switch such that the switch is cycled on and off at times when the current through the switch and the diode are essentially zero. Energy stored in the capacitor is transferred to a load via an inductor (current sink). Thus power is efficiently converted from a voltage source to a current sink.

SUMMARY OF THE INVENTION

A general feature of the invention is a single-ended, zero-current switching, forward converter circuit which converts energy from a current source for delivery to a voltage load by the combination of (1) a transformer constructed to have an effective primary leakage inductance $L_{1e}$, (2) a capacitor (capacitance C) that is connected in series with the primary winding of the transformer and is also connected to be charged by the current source, (3) a switching device connected in series with the primary winding to selectively couple the capacitor to the primary winding, (4) a unidirectional conducting device connected in series with the secondary winding in an orientation to conduct when the switching device is conducting, and (5) a controller for selectively closing and opening the switching device to transfer energy from the capacitor via the effective primary leakage inductance to the voltage load during an energy transfer cycle having a characteristic time scale determined by $L_{1e}$ and C.

Preferred embodiments of the invention include the following features. The controller sets the switching device into a blocking mode in response to cessation of conduction by the unidirectional conducting device. An inductor is connected in series with the capacitor for causing the current from the current source to be effectively constant during the energy transfer cycle. The closing and opening of the switching device is caused to occur at a fixed frequency. A filtering capacitor is connected in series with the first unidirectional device to store energy delivered to the load between energy transfer cycles. The transformer includes an auxiliary discrete inductor contributing to the effective value of $L_{1e}$, the inductor being connected in series with either the primary winding or the secondary winding.

In some embodiments, a second unidirectional conducting device is connected in parallel with the first capacitor and oriented to conduct the transformer's primary current after the capacitor has been discharged during the energy transfer cycle, thereby preventing the capacitor from becoming negatively charged and hence resonating with the transformer. The closing and opening of the switching device can be caused to occur at a variable frequency to effect output voltage regulation.

In some embodiments, the circuit is further adapted to generate a plurality of output voltages for delivery respectively to a plurality of loads; then the transformer includes a plurality of secondary windings each associated with one of the loads, the secondary windings having relative numbers of turns that correspond to the relative voltages to be delivered respectively to said loads, and there are a plurality of unidirectional conducting devices each connected in series with one of the secondary windings in a direction to conduct when the switching device is conducting. The transformer is constructed to minimize the leakage inductances among the secondary windings. These are also a plurality of filtering capacitors connected in series respectively with the unidirectional devices.

The converter efficiently converts power from a current source to a voltage sink and is capable of providing isolation, voltage step-up or step-down, and voltage regulation. In embodiments for serving multiple loads, different voltages can be supplied to different loads and the relative voltages will closely track the relative numbers of turns of the corresponding secondary windings.

Other advantages and features will become apparent from the following description of the preferred embodiment, and from the claims.

DESCRIPTION OF THE PREFERRED EMBODIMENT

We first briefly describe the drawings.

DRAWINGS

FIGS. 1, 3 are two converter circuit embodiments.

FIGS. 2A through C depict waveform charts representing the operation of the converter circuit of FIG. 1.

FIGS. 4, 5 are alternate embodiments of transformers for use in the circuits of FIGS. 1, 3.

FIG. 6 is another converter circuit embodiment having multiple outputs.

STRUCTURE AND OPERATION

Figure 1:
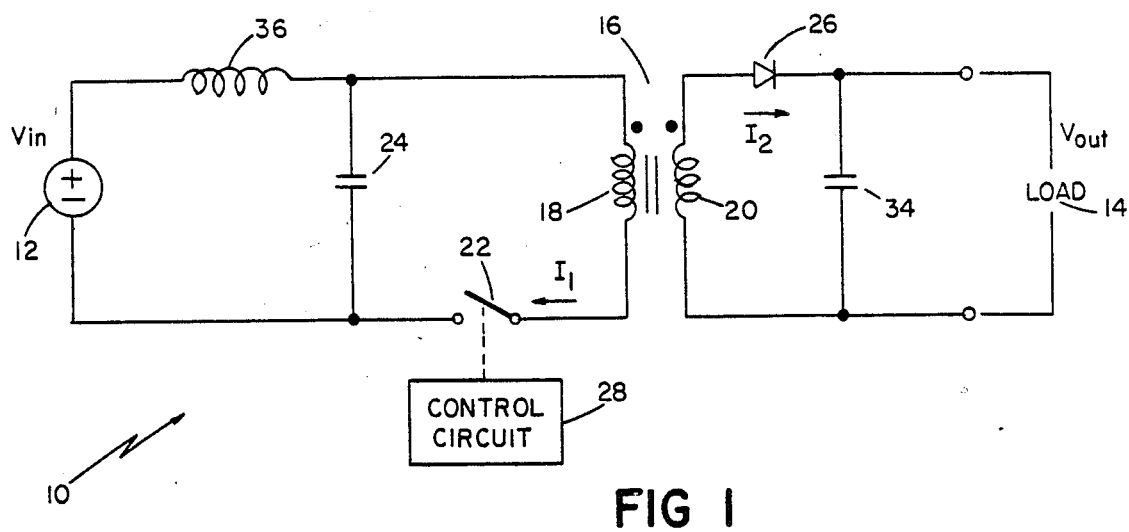

Referring to FIG. 1, zero-current switching, forward, single-ended converter 10 converts power from a high impedance current source (the combination of supply 12 and inductor 36) for delivery to a low impedance voltage sink (load) 14 via a transformer 16. Transformer 16 provides isolation and voltage multiplication functions. Transformer 16 is constructed to exhibit a non-negligible, controlled effective primary leakage inductance defined as $$L_{1e} = \frac{L_1 L_2 - M^2}{L_2}$$

where $L_1$ and $L_2$ are the self inductances respectively of the primary and secondary windings 18, 20, and M is their mutual inductance. An example of a possible transformer construction is described in the Vinciarelli patent; as an alternative to that construction, the bobbins holding the primary and secondary windings may be concentric to one another with the leakage inductance controlled by the radial spacing between them.

The primary winding 18 is connected in series with a switching device 22 and a capacitor 24 (of capacitance C). The secondary winding 20 is connected in series with a unidirectional conducting device 26. The polarities of the windings 18, 20 (indicated by standard dot notation) and the polarity of device 26 are arranged so that device 26 conducts current when switch 22 is conducting current thus establishing a forward (rather than a flyback) converter topology.

Capacitor 24 and the effective primary leakage inductance $L_{1e}$ of transformer 16 define a characteristic time scale for energy transfer cycles of the converter of $$T/2 = \pi L_{1e} C.$$

Switching device 22 is controlled by a control circuit 28 to be switched on with a fixed repetition rate and to be switched off at the end of each energy transfer cycle when negligible current is flowing in switching device 22, thus minimizing switching losses.

Referring to FIGS. 2A through 2C, prior to a time $t_0$, current from source 12 has charged capacitor 24 to a voltage approaching a peak value $V_p$ (FIG. 2C). At time $t_0$, control circuit 28 sets switching device 22 into a conducting mode (FIG. 2A) and capacitor 24 discharges via primary winding 18 (FIG. 2C). Unidirectional conducting device 26 is forward biased and current flows through device 26 into a filtering capacitor 34 and the load. Thus FIG. 2A also represents the conduction state of device 26. FIG. 2B depicts both the current ($I_1$) flowing in switching device 22 and the current ($I_2$) flowing in unidirectional conducting device 26. Those currents have a finite rise and fall time due to the combination of capacitor 24 and the effective primary leakage inductance $L_{1e}$. After the voltage on capacitor 24 falls to a valley value ($V_v$), the discharging cycle ends and the primary current ($I_1$) is negligibly small because $L_{1e}$ is arranged to be much smaller than $L_1$. At this time $t_1$, switching device 22 is reset to a blocking mode by control circuit 28, beginning a charging cycle (FIG. 2C) until at time $t_2$ the next discharge cycle begins. Thus between $t_0$ and $t_1$, energy has been efficiently transferred from capacitor 24 through the leakage inductance of transformer 16 to the load, whereas from $t_1$ to $t_2$ this energy is supplied to capacitor 24 by the current source consisting of supply 12 and inductor 36. The current carried by inductor 36, whose reactance is large compared with $L_{1e}$ is essentially constant during the characteristic time scale of the energy transfer cycle. The voltage across filtering capacitor 34 is $$V_{out} \simeq V_{in} \frac{n_2}{n_1}$$

where $V_{in}$ is the voltage at supply 12, and $n_2/n_1$ is the turns ratio of the two windings 18, 20. Voltage sink 14 is connected across capacitor 34 to receive the output voltage $V_{out}$.

The voltage oscillation across capacitor 24 (FIG. 2C) is centered about the source voltage $V_{in}$ with an amplitude ($V_p - V_v$) which, for a given repetition rate $(t_2 - t_0)^{-1}$, increases with the load current. For large values of the current $$V_p - V_v > 2V_{in}$$

and the voltage across capacitor 24 changes sign during the energy transfer cycle (i.e., the valley value $V_v$ falls below zero), leading to a resonant energy exchange between the effective primary leakage inductance $L_{1e}$ and capacitance C. In this resonant mode of operation, energy transferred from capacitor 24 to transformer 16 during the early stage of an energy transfer cycle is in part returned to capacitor 24 (during a later stage of the energy transfer cycle) instead of being delivered to the output voltage sink 14. This resonant mode violates the underlying principle of unidirectional energy flow of the forward converter.

Figure 2:
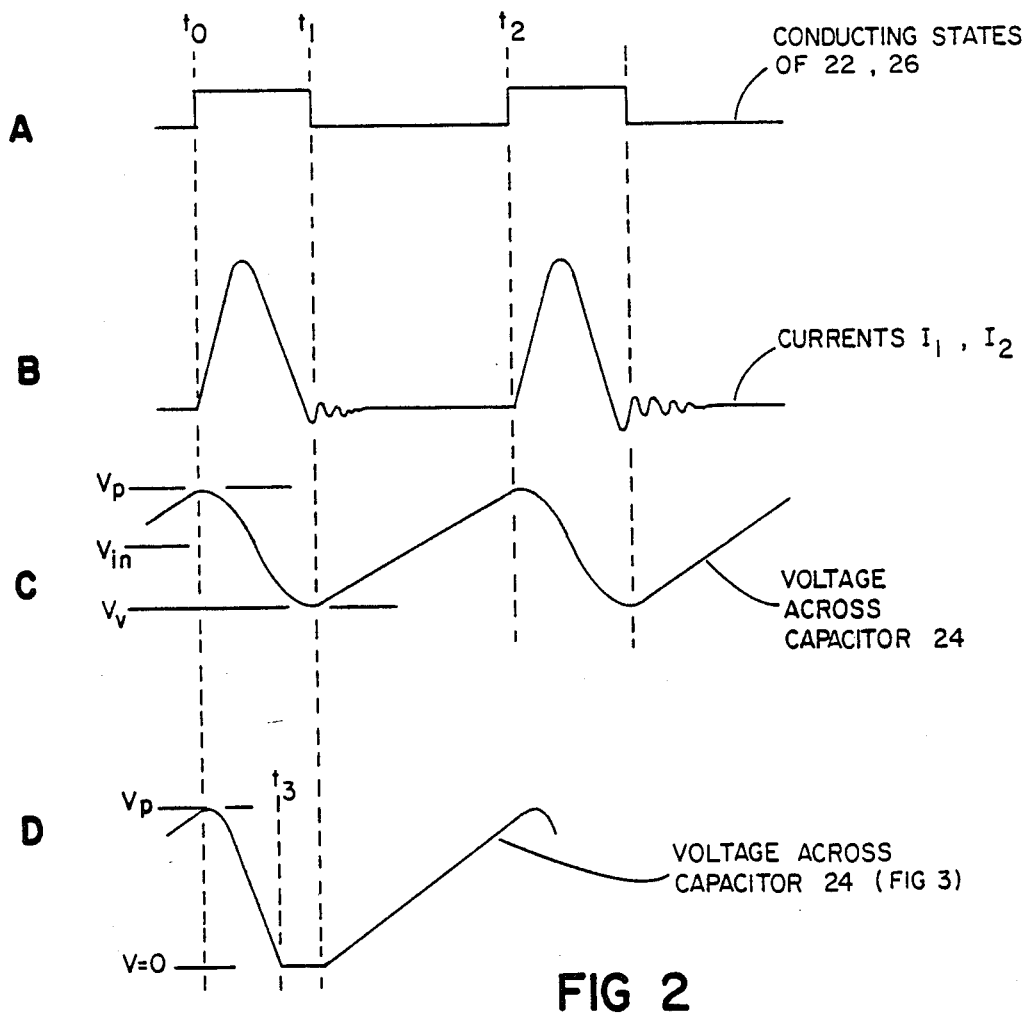
FIG. 2D depicts the voltage waveform across a capacitor in the embodiment of FIG. 3.

The embodiment of FIG. 3 includes a second unidirectional conducting device 40 connected in parallel with capacitor 24 and poled to prevent capacitor 24 from becoming negatively charged by supplying primary current $I_1$ during the latter portion of energy transfer cycles, e.g., during the period from $t_3$ to $t_0$ in FIG. 2D. The duty cycle of device 40 affects the relationship between $V_{out}$ and $V_{in}$, making it possible for controller 28 to regulate the output voltage $V_{out}$ by varying the repetition rate $(t_2 - t_0)^{-1}$ of energy transfer cycles in proportion to the load current. Thus any output voltage lower than the transformed source voltage $$V_{out} < V_{in} \frac{n_2}{n_1}$$

is supported by the embodiment of FIG. 3, thus adding a voltage regulation function which is not present in the embodiment of FIG. 2.

Referring to FIGS. 4, 5, a discrete inductor 50 could be connected in series with the primary (FIG. 4) or secondary (FIG. 5) winding, to complement the effective leakage inductance of transformer 16 thus extending the duration of the energy transfer cycle.

Referring to FIG. 6, an alternative embodiment of the circuits of FIGS. 1, 3 serves a number of loads 14 from a single current source (in FIG. 6, the portion of each circuit to the left of the primary winding is not shown). The transformer is provided with multiple secondary windings 52, one for each load to be served, and a separate unidirectional conducting device and capacitor combination (like the ones shown in FIGS. 1, 3) is connected to each secondary winding for delivering power to the corresponding load. The output voltages $V_2, \ldots, V_3$ are then related to one another based on turns ratios, for example:

$$V_3 \simeq V_2 \frac{n_3}{n_2}$$

Because the circuit is current fed from a high-impedance current source and delivers power to relatively low impedance voltage sinks, the relative voltages available to the various loads 14 will track the relative secondary turns numbers ($n_2, \ldots, n_3$) fairly accurately.

The accuracy of the tracking tends to be adversely affected by the leakage inductances among the secondary windings, but the absence of current discontinuities due to zero current switching mitigates the effect of the secondary-to-secondary leakage inductance. In addition, the transformer is constructed using known techniques for minimizing the secondary-to-secondary leakage inductance.

The converter according to the invention is useful in applications requiring a conversion from a lower input voltage to a higher output voltage (because it places relatively low voltage stresses on the secondary side components), and is especially useful in generating simultaneous multiple output voltages.

Other embodiments are within the following claims.

I claim:

1. A single-ended, zero-current switching forward converter circuit adapted to convert power from a current source to a voltage load, comprising
    a transformer having primary and secondary windings and constructed to have an effective primary leakage inductance $L_{1e}$,
    a capacitor of capacitance C connected in series with said primary winding, said capacitor being further connected to be charged by said source,
    a switching device connected in series with said primary winding to selectively couple said capacitor to said primary winding,
    a unidirectional conducting device connected in series with said secondary winding and oriented to conduct when said switching device is conducting, and
    a controller for selectively closing and opening said switching device to transfer energy from said capacitor via said effective primary leakage inductance to said load during an energy transfer cycle having a characteristic time scale determined by $L_{1e}$ and C.

2. The converter circuit of claim 1 wherein said controller is adapted to set said switching device into a blocking mode in response to cessation of conduction by said unidirectional conducting device.

3. The converter circuit of claim 1 further comprising an inductor connected in series with said capacitor for causing the current from said current source to be effectively constant during said energy transfer cycle.

4. The converter circuit of claim 1 further comprising a second unidirectional device connected in parallel with said capacitor and oriented to conduct the primary current of said transformer after said capacitor has been discharged during said energy transfer cycle.

5. The converter circuit of claim 1 or 4 further comprising a filtering capacitor connected in series with said unidirectional device for storing energy to be delivered to said load.

6. The converter circuit of claim 1 or 4 wherein said transformer includes an auxiliary discrete inductor contributing to the effective value of $L_{1e}$, said inductor being connected in series with either said primary winding or said secondary winding.

7. The converter circuit of claim 1 or 4 further adapted to generate a plurality of output voltages for delivery respectively to a plurality of loads,
    wherein said transformer further comprises a plurality of said secondary windings each associated with one said load, said secondary windings having relative numbers of turns that correspond to the relative voltages to be delivered respectively to said loads,
    said converter circuit further comprising a plurality of said unidirectional conducting devices each connected in series with one of said secondary windings in a direction to conduct when said switching device is conducting.

8. The converter circuit of claim 7 wherein said transformer is constructed to minimize the leakage inductances among said secondary windings.

9. The converter circuit of claim 7 further comprising a plurality of filtering capacitors connected in series respectively with said unidirectional devices for storing energy to be delivered to said loads.

10. The converter of claim 1 wherein said controller causes said closing and opening of said switching device to occur at a fixed frequency.

11. The converter of claim 4 wherein said controller causes said closing and opening of said switching device to occur at a variable frequency to effect output voltage regulation.

12. The converter of claim 7 wherein said controller causes said closing and opening of said switching device to occur at a fixed frequency.

13. The converter of claim 7 wherein said controller causes said closing and opening of said switching device to occur at a variable frequency to effect output voltage regulation.

* * * * *

UNITED STATES PATENT AND TRADEMARK OFFICE
CERTIFICATE OF CORRECTION

PATENT NO. : 4,675,797

DATED : June 23, 1987

INVENTOR(S) : Patrizio Vinciarelli

It is certified that error appears in the above-identified patent and that said Letters Patent is hereby corrected as shown below: Title page:

Under "References Cited" insert the following as it was omitted:

--3,582,754  6/1971  Hoffmann et al. 363/18--.

Signed and Sealed this

Fourteenth Day of November, 1989

Attest:

JEFFREY M. SAMUELS

*Attesting Officer*  *Acting Commissioner of Patents and Trademarks*